United States Patent [19]

Pfander et al.

[11] Patent Number: 5,254,807
[45] Date of Patent: Oct. 19, 1993

[54] SENSOR, IN PARTICULAR RPM SENSOR

[75] Inventors: Werner Pfander, Fellbach; Kristian Leo, Brugstetten; Klaus Heyer, Freiberg; Uwe Köhler, Remseck, all of Fed. Rep. of Germany; Hans-Jürgen Herderich, Anderson, S.C.

[73] Assignee: Robert Bosch GmbH, Stuttgart, Fed. Rep. of Germany

[21] Appl. No.: 842,198

[22] PCT Filed: Jul. 26, 1990

[86] PCT No.: DE 90/00567
§ 371 Date: Mar. 16, 1992
§ 102e Date: Mar. 16, 1992

[87] PCT Pub. No.: WO 91/04494
PCT Pub. Date: Apr. 4, 1991

[30] Foreign Application Priority Data

Sep. 14, 1989 [DE] Fed. Rep. of Germany ....... 3930702

[51] Int. Cl.$^5$ ................ H01L 23/28; G01P 3/44; H05K 5/06
[52] U.S. Cl. .................... 174/52.2; 174/50; 174/52.3; 324/173

[58] Field of Search ............ 174/50, 50.5, 50.52, 174/50.53, 52.2, 52.3; 324/173, 174; 220/DIG. 29, DIG. 31; 264/345; 425/DIG. 47; 156/306.6, 309.6

[56] References Cited

U.S. PATENT DOCUMENTS

| 4,652,818 | 3/1987 | Buchschmid et al. | 324/174 |
| 4,680,543 | 7/1987 | Kohen | 324/173 |
| 5,039,942 | 8/1991 | Buchschmid et al. | 174/52.2 |

Primary Examiner—Harold Broome
Attorney, Agent, or Firm—Edwin E. Greigg; Ronald E. Greigg

[57] ABSTRACT

An RPM sensor for anti-lock and/or traction control systems of motor vehicles or for engine speed governing or gasoline or Diesel injection control. The RPM sensor has a housing, receiving electrical components, with a first housing part of plastic that is at least partly enveloped by a second housing part, produced in an injection molding process, likewise from plastic. To attain a moisture-proof, material bond between the two housing parts, a melting element of a plastic having a lower melting point than that of the plastic of the housing parts is disposed in a contact zone between the two housing parts. When the second housing part is formed, the melting element is heated above its melting point, and a material bond of the two housing parts is attained which protects the RPM sensor against moisture dirt, stress, etc.

13 Claims, 1 Drawing Sheet

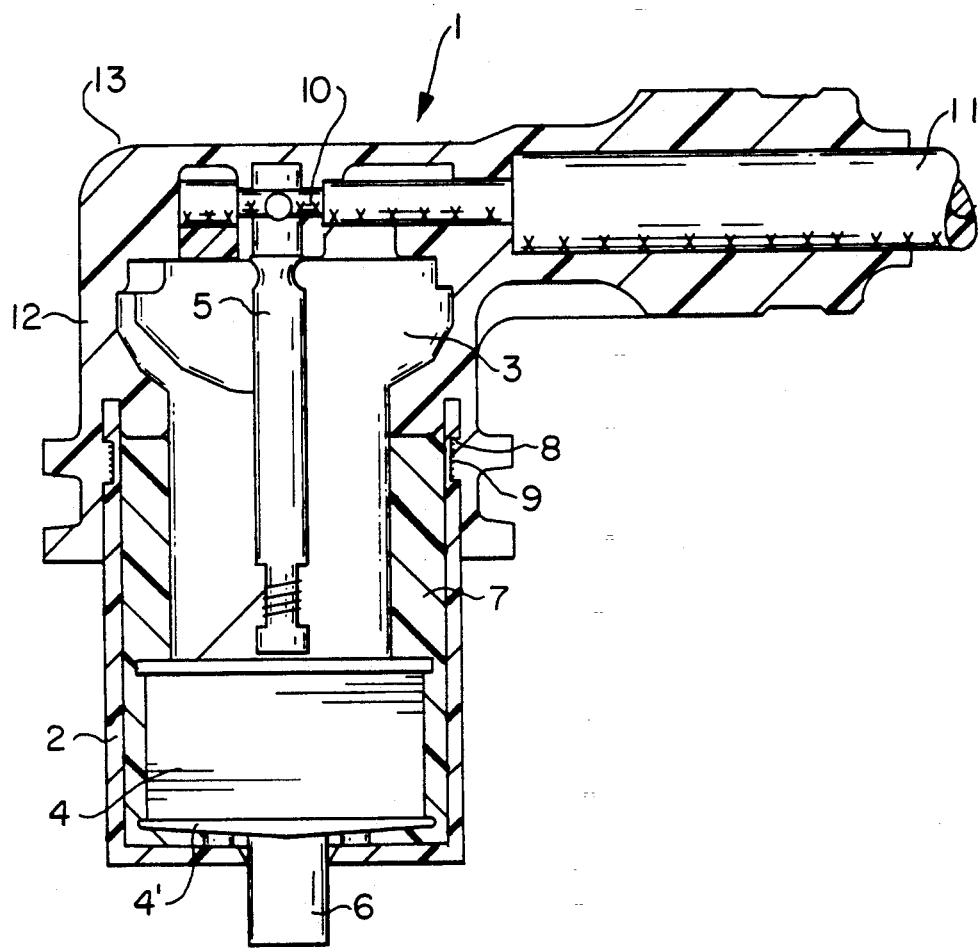

SENSOR, IN PARTICULAR RPM SENSOR

BACKGROUND OF THE INVENTION

The invention is based on a sensor as defined hereinafter to the main claim.

Electromagnetic measuring sensors for use as speed sensors in motor vehicles are already known (EP-A-194 213 and EP-A-278 806). The measuring sensors have a two-part housing, in one housing part of which the electrical sensor elements are essentially received. The second housing part is produced by coating the first housing part with plastic; the second housing part fits around the first housing part along the entire circumference of a contact zone between the two housing parts. Since in the region of the contact zone the first housing part has an encompassing collar-like protrusion that is enclosed by the second housing part, not only a force-locking connection but also a form-fitting bond between the two housing parts are attained. Nevertheless, this kind of bond is not moisture-proof over the long term, particularly if the housing is exposed to high alternating temperature stress, vibration, or shear forces from mistakes during assembly.

From the technical dictionary, "ABC Chemie" [ABCs of Chemistry], Verlag Harri Deutsch, Thun and Frankfurt am Main, 1979, it is known to bond like or unlike kinds of materials to one another simply with adhesive, without altering their structure. For example, a melting adhesive that is applied to the solid surface of the workpieces to be bonded must be made liquid by being heated. The setting of the adhesive is brought about by solidification of the melt. Adhesive bonding has thus far not been used in joining housing parts for sensors.

An RPM sensor is already known (German Offenlegungsschrift 34 00 870) in which the first housing part is a coil holder of plastic intended for receiving a pole core, a coil and two current rails. After the completion of the coil holder with the aforementioned electrical components, this holder is received in a second housing part. This part is produced in an injection molding process from plastic and is provided with the embedded end of a line. The housing of the RPM sensor, formed substantially by the two housing parts, also has an opening, which is closed by the insertion of a cap once the line has been connected to the current rails. An RPM sensor of this kind is exposed to severe stress, particularly from moisture, dirt, heat and jarring. The form fit with the second housing part, attained by the fitting in of the first housing part, and the fitting in of the cap still do not protect the RPM sensor reliably against the penetration of moisture, however, which can cause malfunctions or failure. Therefore the two housing parts are additionally materially joined in their contact zone, and the cap is additionally materially joined to the second housing part, by ultrasonic welding. This provision makes the RPM sensor more expensive, because it requires additional assembly steps and considerable expenditure for the apparatus.

ADVANTAGES OF THE INVENTION

The sensor according to the invention has the advantage over the prior art that the tightness of the housing is already attained once the second housing part is made, because the melting element undergoes heating past its melting point when the first housing part is coated with the molten plastic, which leads to a fused bond between the two housing parts.

Advantageous further features of and improvements to the sensor disclosed in the main claim are possible with the provisions recited in the dependent claims.

Especially if the heat transfer to the melting element in the course of the injection process is inadequate, the provision that the melting element received in the indentation is a filament, foil, tape or a viscous solidifying film is especially advantageous, because melting of the melting element and bonding of the housing parts are reliably attained as a result.

The embodiment of the sensor set forth herein has the advantage that melting element, produced from various molds for semifinished products, is received on the first housing part such that it is protected against damage and is positionally secured. The positional securing of the melting element and its joining to the first housing part can be still further improved if after production of the second housing part, the sensor is subjected to a heat treatment process, in which the melting element is heated above its melting point.

BRIEF DESCRIPTION DRAWING

An exemplary embodiment of the invention is shown in simplified form in the drawing in terms of a longitudinal section taken through an RPM sensor as the sensor, and is described in further detail in the ensuing description.

DESCRIPTION OF THE EXEMPLARY EMBODIMENT

The sensor shown in the drawing is embodied as an RPM sensor 1, which is intended for use for anti-lock and/or traction control systems of motor vehicles. It is also suitable as an element for engine speed governing and for controlling gasoline or Diesel injection. The RPM sensor 1 has a cup-shaped first housing part 2, open at the top, made of a thermoplastic plastic such as polyamide or the like. A coil holder 3 having a coil 4 with a winding is inserted into the housing part 2. The winding of the coil 4 is connected to two current rails 5 (located one behind the other in the drawing), which protrude upward past the coil holder 3. Toward the bottom, the housing part 2 is pierced for the passage of a pole pin 6 through it. The above electrical components of the RPM sensor 1 are fixed in a moisture-proof manner in the first housing part 2 by means of a casting composition 7, such as epoxy resin or the like.

On its upper end portion, the first housing part 2 has a groove-like indentation 8 on its circumference, into which a melting element 9, covering the groove bottom and made of a plastic, such as polyamide or the like, and having a lower melting point than that of the housing part 2, is introduced. The melting element 9 may be embodied as a filament, which completely or partially fills the indentation 8 in a plurality of windings adjacent one another and layers one above the other. The melting element 9 may, however, instead be a foil, introduced into the indentation 9 in one or more layers, or a tape or a film that is applied in a viscous state and hardens.

For supplying electrical current to the coil 4 and for picking up signals, the free ends of the current rails 5 that protrude past the coil holder 3 are each bonded to one conductor 10 of a two-conductor sheathed line 11.

In this assembled state, the first housing part 2, with the sheathed line 11 connected to it, is placed in an injection molding tool, not shown, and is coated with a thermoplastic plastic, such as polyamide or the like, to form a second housing part 12 of he RPM sensor. In this process, the second housing part 12 envelops the end portion of the sheathed line 11, its conductors 10, the current rails 5 and the coil holder 3. The second housing part 12 also fits over the upper end portion of the first housing part 2, forming a contact zone in which the indentation 8, with the melting element 9 fitted into it, is located. By means of this molding process, the housing 13 of the RPM sensor 1, comprising the first housing part 2 and the second housing part 12, is completed.

The plastic used for the second housing part 12 has a melting point that preferably matches or is above that of the plastic selected for the first housing part 2. Thus the melting point of the plastic for the second housing part is likewise above the melting point of the plastic from which the melting element 9 is produced. When the molten plastic for forming the second housing part 12 is injected into the injection mold, it envelops the melting element 9, which as a result is heated above its melting point and bonds materially to both the first housing part 2 and the solidifying second housing part 12. The bond of the two housing parts 2 and 12 thereby produced in the contact zone is completely moisture-proof.

In a modification of the description production process of the RPM sensor housing 13, the melting element 9, after being introduced into the indentation 8 of the first housing part 2, can already be subjected to a heat treatment, with which an intimate material bond with the first housing part 2 is attained by melting of the melting element 9. As a result, a positional securing of the melting element 9 in the indentation 8 is also attained.

A moisture-proof material bond of the two housing parts 2 and 12 can also be produced by providing that in a heat treatment process of the RPM sensor 1, after the second housing part 12 has been produced, the melting element 9 is heated above its melting point. The melting element 9 then melts and enters into a material bond with the two housing parts 2 and 12. This kind of procedure is appropriate whenever the heating of the melting element 9, in the course of molding of the second housing part 2, is inadequate.

In a departure from the exemplary embodiment described, the melting element 9 may also be disposed on the free side face of the end plate 4' of the coil 4 that borders the pole pin 6 instead. In this variant, the first housing part 2 and the casting composition 7 are dispensed with. The coil end plate 4' instead replaces the first housing part 2. In the injection molding of the second housing part 12, the space that in the original exemplary embodiment is occupied by the first housing part 2 and the casting compound 7 is occupied by the plastic used to produce the second housing part. The free side face of the end plate 4' can receive the melting element 9 in an encompassing indentation on its face end; the melting element is preferably embodied as an annular disk or applied in the form of a film.

We claim:

1. An RPM sensor (1) comprising a housing (13) for receiving electrical components, said housing (13) includes a first housing part and a second housing part (12), each of plastic, said first housing part (2) includes an upper end which is partly enveloped by a lower end of said second housing part (12), wherein a bond of said first and second housing parts (2 and 12) is attained over an entire circumference of a contact zone produced by encompassing the upper end of the first housing part (2) with the second housing part (12), said first housing part includes a circumferential groove (8) near its upper end, a melting element (9), which produces a material bond with both housing parts (2 and 12), of a plastic having a lower melting point than that of the plastic or plastics forming the first and second housing parts (2, 12) is disposed in said circumferential groove (8) in said first housing part that encompasses the circumference of the upper end face of the first housing part (2) whereby a contact zone between said first and second housing is formed.

2. A sensor as defined by claim 1, in which said melting element (9) received in the circumferential groove (8) is a filament, foil, tape or a viscous, solidifying film.

3. A method for producing an RPM sensor which comprises:
   forming a cup-shaped first housing part made of plastic with an open upper end and with an aperture in its bottom,
   inserting sensor electrical components into said open upper end of said first housing part with a sensor pin extending from said aperture in the bottom of said first housing part,
   placing a plastic melting element about an outer circumference of the upper end of said first housing part in which the melting element has a lower melting point than that of the plastic first housing part,
   placing the first housing part with the electrical components therein within an injection molding apparatus,
   forming a second plastic housing part by injection molding in which said second plastic housing part encompasses said electrical components with a lower portion of said second plastic housing part extending over and encompassing the upper end of said first housing part,
   whereby during said injection molding of said second plastic housing part, said melting element is heated above its melting point to form a bond between said lower end of said second plastic housing part and the circumference of the upper end of said first housing part.

4. A method as defined by claim 3, in which after the production of the second housing part, the sensor is subjected to a heat treatment process, in which the melting element is heated above its melting point.

5. A method as defined by claim 3, in which the melting element is either a filament, a foil, a tape or a viscous, solidifying film.

6. A method as defined by claim 3, in which to place said first housing in the injection molding apparatus a circumferential groove is formed near its upper end and said melting element is placed in said circumferential groove.

7. A method as defined by claim 4, in which to place said first housing in the injection molding apparatus a circumferential groove is formed near its upper end and said melting element is placed in said circumferential groove.

8. A method as defined by claim 5, in which to place said first housing in the injection molding apparatus a circumferential groove is formed near its upper end and said melting element is placed in said circumferential groove.

9. A method as defined by claim 3, in which the melting element is melted onto the first housing part before the second housing part is injection molded thereon.

10. A method as defined by claim 5, in which the melting element is melted onto the first housing part before the second housing part is injection molded thereon.

11. A method as defined by claim 6, in which the melting element is melted onto the first housing part before the second housing part is injection molded thereon.

12. A method as defined by claim 7, in which the melting element is melted onto the first housing part before the second housing part is injection molded thereon.

13. A method as defined by claim 8, in which the melting element is melted onto the first housing part before the second housing part is injection molded thereon.

* * * * *